United States Patent [19]

Shimada

[11] Patent Number: 4,784,437

[45] Date of Patent: Nov. 15, 1988

[54] AUTOMOTIVE SEAT

[75] Inventor: Makoto Shimada, Akishima, Japan

[73] Assignee: Tachi-S., Ltd., Tokyo, Japan

[21] Appl. No.: 102,140

[22] Filed: Sep. 29, 1987

[51] Int. Cl.$^4$ .............................................. A47C 7/02
[52] U.S. Cl. .............................. 297/452; 297/DIG. 1;
297/DIG. 2; 5/460
[58] Field of Search .................. 297/DIG. 1, DIG. 2,
297/452, 458; 5/460

[56] References Cited

U.S. PATENT DOCUMENTS

| 2,556,924 | 6/1951 | Karpen | 5/460 |
| 2,638,608 | 5/1955 | Garrigus, Sr. | 5/460 |
| 3,154,797 | 11/1964 | Lovette | 5/460 |
| 3,712,673 | 1/1973 | Swenson | 297/DIG. 2 |
| 3,728,747 | 4/1973 | Docker | 5/460 |
| 4,606,580 | 8/1986 | Yoshizawa | 297/DIG. 2 |
| 4,679,851 | 7/1987 | Solie et al. | 297/452 |

Primary Examiner—Francis K. Zugel
Attorney, Agent, or Firm—Oldham & Oldham Co.

[57] ABSTRACT

An automobile seat comprising a main foam pad and a sub-pad made of a softer foam material relative to the foam cushion body, the sub-pad being mounted on the main foam pad. In this seat, a covering member is provided over those pads such that the section of the covering member which covers the sub-pad is fixed in a dotted manner to the section thereof which covers the main foam pad. With this arrangement, a plurality of decorative creases are created in the lateral side portions of the covering member section which covers the lateral surfaces of the sub-pad.

11 Claims, 2 Drawing Sheets

AUTOMOTIVE SEAT

BACKGROUND OF THE INVENTION

1. Field of the Invention

The present invention relates to a seat used in automobile, and in particular relates to an automotive seat having a main foam cushion body and secondary cushion body of a softer foam material with respect to the main cushion body for the purpose of improving a seating comfortableness of the seat.

2. Description of Prior Art

In order to improve a seating sense of an automotive seat, there is provided a multiple layer seat which includes a main cushion body and secondary cushion body mounted on the main cushion body.

Reference is made to FIGS. 1 and 2, in which this kind of conventional seat (in this embodiment, a seat cushion (A)) is shown as comprising a main cushion body (a) supported by a frame (4) and a spring member (4), and a secondary cushion body (b) fixed on the main cushion (a). The main cushion body (a) includes a main pad (8a) which is foamed in a mold, using an urethane material, and a covering member (8b) which covers the main pad (a). The secondary cushion body (b) includes a subpad (9a) made of a softer foam material (a slab, for example) than that of the main pad (a), and a covering member (7a) which covers the secondary cushion body (b).

On the surface of the secondary cushion body (b), is formed a decorative button (6a) whose dependent leg portion is fixed to the surface of the main cushion body (a). Thus, the secondary cushion body (b) is secured to the main cushion body (a) in an integral manner, by virtue of the decorative button (6a).

It is observed that a recess (c) is defined along the boundary between the main and secondary cushion body (a)(b), which adds to the aesthetic effect on the outer appearance of the seat.

Similarly, the seat back (B) comprises a main cushion body (a') and a secondary cushion body (b') with a recess (c') defined at the boundary therebetween in the same manner as the seat cushion (A).

According to thus-constructed seat cushion and back (A)(B), decorative creases are created radially at each of the decorative buttons (6a) so as to provide a plurality of decorative creases on the seating surface in a highly aesthetic fashion, because of the fact that the surfaces of the secondary cushion bodies (a)(a') are pulled down at the buttons (6a) to create the decorative creases around the buttons (6a).

However, no such decorative creases are produced in the lateral walls of the secondary cushion bodies (a)(a') by the reason of the covering members (7a, 7a') being merely stretched due to the resiliency of the sub-pad (9a), with no crease therein.

To solve this problem, there has been the proposal that the covering member (7a) of the secondary cushion body (b) is sewn with gathers to the main cushion body (a) to thereby produce a plurality of decorative creases on the lateral walls of the secondary cushion body (b). But, such decorative creases creation by gathering method requires a great number of cloth materials and assembling steps, and it is disadvantageous for enconomical and rapid manufacture of the seat.

SUMMARY OF THE INVENTION

It is a primary purpose of the present invention to provide an automotive seat of a type having main and secondary cushion bodies, in which a decorative crease is formed in an easy manner on the lateral walls of the secondary cushion body.

To accomplish the above purpose, in accordance with the present invention, the covering member of the secondary cushion body is at its localized portions fixed in a spot way to that of the main cushion body. Thus, the covering member of the secondary cushion body is pulled down at each of its local spot fixed portions in a direction towards the main cushion body, whereupon such pulling force is exerted on the lateral side portions of the covering member of the secondary cushion body, to thereby produce decorative creases at the lateral walls of the secondary cushion body in a hight-wise direction thereof. In other words, at the lateral walls of the secondary cushion body, there are produced a plurality of decorative creases such that they are separated from one another at a predetermined distance in a longitudinal direction of the secondary cushion body along its lateral walls.

It is another purpose of the present invention to provide an automotive seat of a type having main and secondary cushion bodies in which one unitary sheet of covering member is used for covering both main and secondary cushion bodies, without need to use two separate covering members.

To this end, one unitary seat of covering member is affixed to both main and secondary cushion bodies in such a manner that the covering member is part-way inserted into a recess formed along a boundary between the lateral walls of the main cushion body and those of the secondary cushion body. This construction gives such an impression as if the secondary cushion body was formed independently of the main one. Hence, there is eliminated the necessity of preparing two separate covering members, which reduces the number of required covering members and makes more simplified the forming process of the same.

In one aspect of the present invention, the aforementioned recess formed between the main and secondary cushion bodies is formed in a substantially U-shaped configuration in section, and the unitary covering member is partly inserted into such U-shaped recess, and further the upper section of the covering member which covers the secondary cushion body is at its localized portions fixed in a spot way to the lower section of the covering member which covers the main cushion body, along the direction of the recess formed therebetween. With this structure, the decorative creases are formed at the lateral sides of the secondary cushion body by use of one unitary sheet of covering member.

DETAILED DESCRIPTION OF PREFERRED EMBODIMENTS OF THE INVENTION

Figure 3:
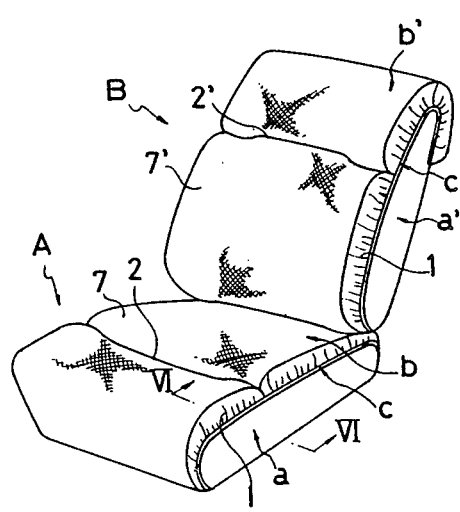
FIG. 3 is a perspective view showing a first embodiment of an automotive seat in accordance with the present invention.
Figure 4:
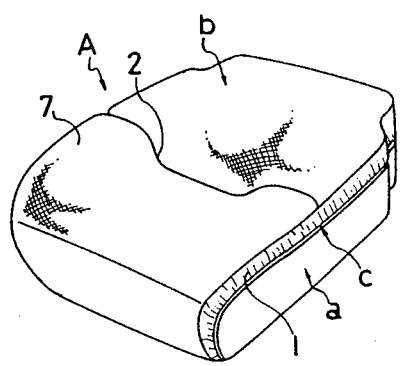
FIG. 4 is a perspective showing a seat cushion of the same automotive seat as in the FIG. 3.

Referring to FIG. 3, is illustrated an automotive seat in accordance with the present invention. In this figure, reference character (A) denotes a seat cushion comprising a main cushion body (a) and secondary cushion body (b), and character (B) denotes a seat back comprising a main cushion body (a') and secondary cushion body (b').

The secondary cushion bodies (b)(b') are respectively fixedly secured on the main ones (a)(a'). It is observed that a boundary extends between those cushion bodies along the lateral walls of the seat, and recesses (c)(c') are formed along such boundary.

A plurality of decorative creases (1) are formed in the longitudinal direction of the recesses (c)(c').

The illustrated seat cushion (A) and seat back (B), respectively, have decorative recessed stripes (2)(2') extending transversely thereof, which are respectively formed by pulling down the covering member sections (7)(7') by means of anchoring members (not shown) provided on the back of the sections (7) (7'). Although not shown in the drawings, in place of such recessed stripes (2)(2'), decorative buttons may be provided which have a downwardly dependent leg to be fixed to insert wires embedded in the main cushion bodies (a)(a').

Figure 1:
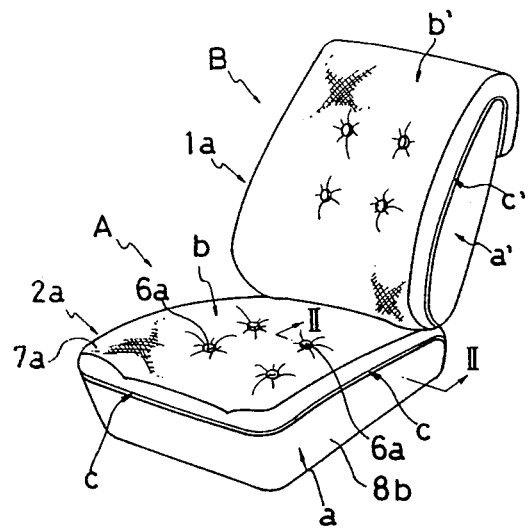
FIG. 1 is a perspective view of a conventional automotive seat.
Figure 2:
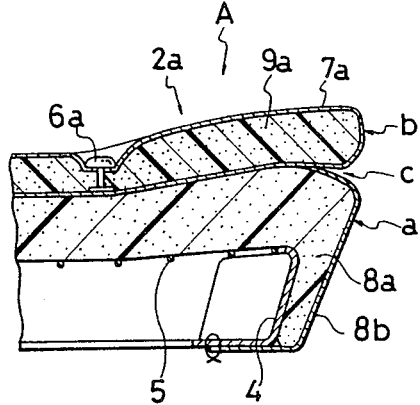
FIG. 2 is a sectional view taken along the line II—II in the FIG. 1.

FIG. 2 shows the seat cushion (A) separated from the seat back (B).

Now, the decorative creases (1) in the seat cushion (A) will be described with reference to FIGS. 5 to 8.

Figure 5:
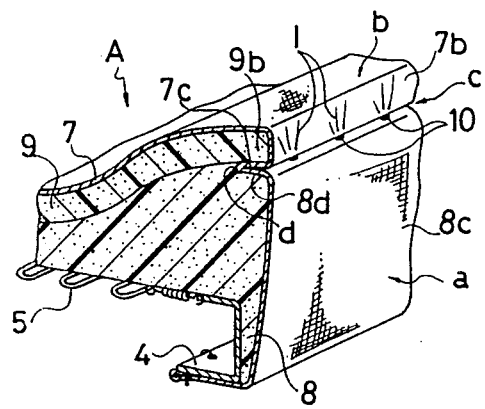
FIG. 5 is a partially enlarged sectional view of a principal portion of the present invention.
Figure 6:
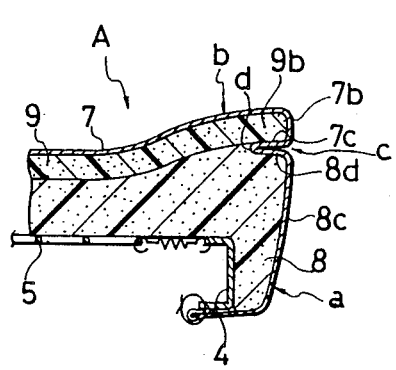
FIG. 6 is a sectional view taken along the line VI—VI in the FIG. 3.

Referring firstly to FIG. 5, the main cushion body (a) comprises a main pad (8) which is mounted on a metallic frame (4) of U-shaped configuration in section as well as on a sinuously winding spring (5). The main pad (8) is formed in a desired seat contour by foaming urethane material in a mold.

The secondary cushion body (b) comprises a sub-pad (9) which is bonded by an adhesive to the top surface of the main pad (8). The sub-pad (9) is made of a softer foam material (for example, a slab material) with respect to the main pad (8) and has a fixed uniform thickness.

Along the boundary between the sub-pad (9) and main pad (8), formed is a cut-away recess (d) of a substantially U-shaped configuration. More specifically, the cut-away recess (d) is formed between the peripheral end portion (9b) of the sub-pad (9) and the upper peripheral end portion of the main pad (8).

Designations (7) and (8c) denote the first and second sections of covering member, respectively. The first covering member section (7) covers the top and lateral surfaces of the sub-pad (9), and the second covering member section (8c) covers the exteriorly exposed lateral surfaces of the main pad (8). It should be noted that those first and second sections (7) and (8c) are formed continuously by one unitary sheet of covering member.

As shown in the drawings, the whole covering member including the foregoing two sections thereof (7)(8c) is inserted part-way into the cut-away recess (d) along the longitudinal direction of the same. Hence, the first section (7) covering the sub-pad (9) has a first inwardly turned portion (7c) extending along the lower surface of peripheral end portion (9b) of the sub-pad (9) into the cut-away recess (d). Similarly, the second section (8c) covering the main pad (8) has a second inwardly turned portion (8d) extending along the surface of upper peripheral end portion of the main pad (8) into the cut-away recess (d). It is, of course, noted that the first and second inwardly turned portions (7c) (8d) are continuously connected together in an integral manner as the covering member in question is formed of one unitary sheet, as stated before.

The first covering member section (7) is bonded by an adhesive to the top surface of the sub-pad (9) and has a lateral side portion (7b) covering the lateral surface of the sub-pad (9).

In the illustrated embodiment, it is noted that while the covering member section (7) is bonded by an adhesive to the top surface of the sub-pad (9), yet, its lateral side portion (7b) and first inwardly turned portion (7c) are not bonded to the sub-pad (9). However, it is optional to bond the lateral side portion (7b) and both first and second inwardly portions (7c) (8d) to the sub-pad (9) as well as the cut-away recess (d), respectively.

With regard to the second covering member section (8c) and its second inwardly turned portion (8d), it is a matter of choice whether to bond them to the main pad (8), but the ends of the second covering member section (8c), preferably, are secured to the frame (4) by means of a hog ring or other suitable securing member.

The first inwardly turned portion (7c) of the first covering member section (7) is fixed in a dotted manner, i.e., at multiple, spaced apart points, to the second inwardly turned portion (8d) of the second covering member section (8c) in such a manner that the fixed portions thus dottedly formed in those first and second inwardly turned portions (7c) (8d) are spaced apart from one another at a predetermined distance in a longitudinal direction of the lateral walls of the sub-pad (9) (namely, the lateral walls of the secondary cushion body (b)).

In the present embodiment, the first and second inwardly turned portions (7c)(8d) are bonded together by an adhesive in the above-mentioned dotted manner, but such dottedly fixing way is not limited to this adhesive bonding way, and if desired, other various fixing ways may be employed.

Reference numeral (10) referes to the above-described dottedly fixed portions in the first and second inwardly turned portions (7c) (8d).

Accordingly, a decorative crease (1) is produced at each of the dottedly fixed portions (10), extending vertically therefrom along the lateral side portion (7b) of the first covering member section (7). Thus, a plurality of such decorative creases (1) are formed such that they are spaced apart from one another at a predetermined distance in correspondence with the dottedly fixed portions (10), in a longitudinal direction of the lateral walls of the sub-pad (9).

Figure 7:
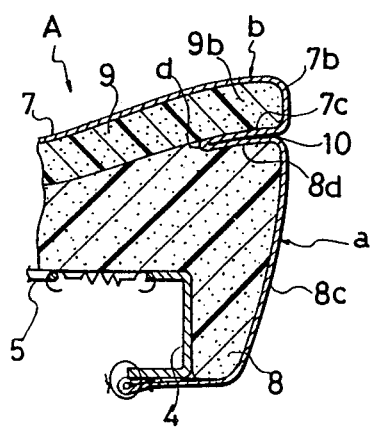
FIG. 7 is a partially enlarged sectional view showing the portion of the covering member which is fixed together.
Figure 8:
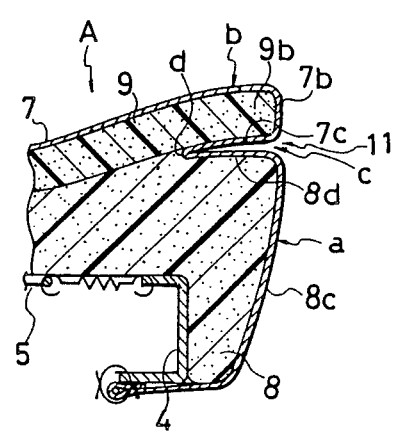
FIG. 8 is a partially enlarged section view showing the portion of the covering member which is not fixed togher.

As best shown in FIG. 7 and FIG. 8, it is to be understood that the first inwardly turned portion (7c) is bonded to the second one (8d), providing a closed state, at the aforementioned dottedly fixed portions (10), while on the other hand, at non-fixed portions (indicated at (11) in FIG. 8), the former portion (7c) is separated away from the latter one (8d), providing an open state. Therefore, the lateral side portion (7b) of the first covering member section (7) is pulled down at each of the dottedly fixed portion (10), while at each of the non-fixed portions (11), the same lateral side portion (7b) is pulled upwardly due to the expanding property of the sub-pad (9), with the result that a plurality of the decorative creases (1) are produced in a hight-wise direction of the secondary cushion body (b) at its lateral side walls in a mutually spaced-apart relation.

It may be arranged that, by means of sewing or high frequency wave welding method, the first inwardly turned portion (7c) is fixed to the second one (8d) in the above-described dotted manner in order that the decorative creases (1) are created.

As another alternative, the second inwardly turned portion (7c) may be bonded by an adhesive to the portion of the cut-away recess (c) disposed at the sub-pad (9), for the purpose of creating the decorative creases (1).

In summary, any other means may be adpated in order to produce the decorative creases (1), so far as it is effective for causing a pulling force on the part of the lateral side portion (7b) of the first covering member section (7) in a direction towards the second covering member section (8c).

The description above has just been given of preferred embodiments of the present invention, but it shoud be understood that the invention is not limited to the embodiments illustrated, but various other replacement, modifications and additions may structurally be possible without departing from the scope and spirit of the appended claims for the invention.

What is claimed is:

1. An automotive seat comprising:
   a main foam pad;
   a sub-pad fixed on said main foam pad;
   a cut-away recess at substantially U-shaped configuration formed along a boundary defined between said main foam pad and sub-pad;
   a covering member which covers both of said main foam pad and sub-pad with such an arrangement that said covering member is partly inserted into said cut-away recess, thereby defining a first covering member section which covers said sub-pad and a second covering member section which covers said main foam pad, wherein, at said cut-away recess, there are defined first and second inwardly turned portions, respectively, in said first and second covering member sections, each of said first and second inwardly turned portions extending into said cut-away recess; and
   said first inwardly portion being bonded by adhesive at multiple, spaced apart points to said second inwardly portion, whereby a plurality of decorative creases are created in lateral side portions of said first covering member section.

2. An automotive seat comprising:
   a main foam pad;
   a sub-pad fixed on said main foam pad;
   a cut-away recess at substantially U-shaped configuration formed along a boundary defined between said main foam pad and sub-pad;
   a covering member which covers both of said main foam pad an sub-pad with such an arrangement that said covering member is partly inserted into said cut-away recess, thereby defining a first covering member section which covers said sub-pad and a second covering member section which covers said main foam pad, wherein, at said cut-away recess, there are defined first and second inwardly turned portions, respectively, in said first and second covering member sections, each of said first and second inwardly turned portions extending into said cut-away recess; and
   said first inwardly portion being partly bonded by adhesive at multiple, spaced apart points to a portion of said cut-away recess disposed at said sub-pad, whereby a plurality of decorative creases are created in lateral side portions of said first covering member section.

3. The seat as defined in claim 1, wherein said main foam pad is supported on a frame and a spring extended on said frame.

4. The seat as defined in claim 1, wherein said first inwardly portion is fixed by sewing to said second inwardly portion in said dotted manner, to thereby create said plurality of decorative creases.

5. The seat as defined in claim 1, wherein said first inwardly portion is fixed by high frequency wave welding to said second inwardly portion in said dotted manner, to thereby create said plurality of decorative creases.

6. The seat as defined in claim 1, wherein said first inwardly portion is bonded by adhesive at multiple, spaced apart points to said second inwardly portion, to thereby create said plurality of decorative pieces.

7. The seat as defined in claim 1, wherein said inwardly portion is bonded by adhesive at multiple, spaced apart points to said second inwardly portion, such that bonded portions defined thereby between said first and second inwardly portions are spaced apart from one another at a predetermined distance, so that a plurality of decorative creases are created correspondingly to said predetermined distance, along said cut-away recess.

8. The seat as defined in claim 1, wherein said covering member is formed of one unitary sheet, and wherein said covering member is fixed to said sub-pad, excepting a lateral side portion of said second covering member section and said second inwardly turned portion.

9. The seat as defined in claim 1, wherein said covering member is formed of one unitary sheet, wherein said first covering member section is bonded by adhesive at multiple, spaced apart points to said sub-pad, including said lateral side portion and said first inwardly turned portion, and wherein said second covering member section and said second inwardly turned portion are not fixed to said main foam pad.

10. The seat as defined in claim 1, wherein said covering member is bonded by adhesive at multiple, spaced apart points to said main foam pad and sub-pad in such a manner that said first covering member section of said covering member is fixed to a top surface of said sub-pad, while said second covering member section of said covering member is fixed to a lateral side surface of said main foam pad.

11. The seat as defined in claim 1, wherein said sub-pad is formed of a softer foam material with respect to said main foam pad.

* * * * *